(12) United States Patent
Okumura

(10) Patent No.: US 6,184,955 B1
(45) Date of Patent: Feb. 6, 2001

(54) LIQUID CRYSTAL DEVICE AND ELECTRONIC APPARATUS USING IT

(75) Inventor: Osamu Okumura, Chino (JP)

(73) Assignee: Seiko Epson Corporation (JP)

(*) Notice: Under 35 U.S.C. 154(b), the term of this patent shall be extended for 0 days.

(21) Appl. No.: 09/142,964

(22) PCT Filed: Jan. 14, 1998

(86) PCT No.: PCT/JP98/00149

§ 371 Date: Sep. 15, 1998

§ 102(e) Date: Sep. 15, 1998

(87) PCT Pub. No.: WO98/32046

PCT Pub. Date: Jul. 23, 1998

(30) Foreign Application Priority Data

Jan. 17, 1997 (JP) ............................................. 9-6890
Jul. 30, 1997 (JP) ........................................... 9-204698

(51) Int. Cl.[7] .................... G02F 1/1335; G02F 1/1333
(52) U.S. Cl. ................................. 349/96; 349/162
(58) Field of Search ........................ 349/96, 162, 113, 349/114, 61, 64, 105, 98, 194

(56) References Cited

U.S. PATENT DOCUMENTS

| 5,686,979 | * | 11/1997 | Weber et al. | 349/96 |
| 5,986,730 | * | 11/1999 | Hanson et al. | 349/96 |
| 5,986,731 | * | 11/1999 | Iijima | 349/117 |
| 5,999,239 | * | 12/1999 | Larson | 349/96 |
| 6,008,871 | * | 12/1999 | Okumura | 349/61 |
| 6,018,419 | * | 1/2000 | Cobb, Jr. et al. | 359/500 |
| 6,025,897 | * | 2/2000 | Weber et al. | 349/96 |

FOREIGN PATENT DOCUMENTS

| 6-230362 | 8/1994 | (JP) . |
| WO95/17303 | 6/1995 | (WO) . |
| WO95/17691 | 6/1995 | (WO) . |
| WO95/17692 | 6/1995 | (WO) . |
| WO95/17699 | 6/1995 | (WO) . |
| WO95/27919 | 10/1995 | (WO) . |
| WO96/19347 | 6/1996 | (WO) . |
| WO95/01439 | 1/1997 | (WO) . |
| WO97/01440 | 1/1997 | (WO) . |
| WO97/01610 | 1/1997 | (WO) . |
| WO97/01726 | 1/1997 | (WO) . |
| WO97/01774 | 1/1997 | (WO) . |
| WO97/01778 | 1/1997 | (WO) . |
| WO97/01780 | 1/1997 | (WO) . |
| WO97/01781 | 1/1997 | (WO) . |
| WO97/01788 | 1/1997 | (WO) . |
| WO97/01789 | 1/1997 | (WO) . |
| WO97/07653 | 2/1997 | (WO) . |

* cited by examiner

*Primary Examiner*—Kenneth Parker
*Assistant Examiner*—Mike Qi
(74) *Attorney, Agent, or Firm*—Harness, Dickey & Pierce, P.L.C.

(57) ABSTRACT

The present invention provides a liquid crystal device comprising a liquid crystal panel, a polarizer 101, which is provided at one side of the liquid crystal panel, absorbing the light of polarized orientation and transmits light of predetermined polarized orientation which is different than the above polarized light component, and a reflective polarizer 109, which is provided on the opposite side of the polarizer relative to the liquid crystal panel, reflecting the predetermined and limited wavelength range of the visible light and transmitting the predetermined light which is different than the above light component, such that a reflective and a transflective liquid crystal device that can display bright and brilliant colors is realized.

17 Claims, 16 Drawing Sheets

(a)

(b)

(c)

LIQUID CRYSTAL DEVICE AND ELECTRONIC APPARATUS USING IT

TECHNICAL FIELD

The present invention relates to a liquid crystal device, especially to a reflection type liquid crystal device and a transflective type liquid crystal device. The present invention further relates to portable telephones, watches and information processing devices equipped with this liquid crystal device.

BACKGROUND ART

While most of the conventional refection type liquid crystals devices display a black image on a white background, a black (or other colors such as blue) display on a clearly colored background is desired depending on its use. For example, it is well known that a black display on an yellow background is more recognizable than a black display on a white display, which is utilized in traffic signs. Display images such as black on a green background, black on a blue background, black on a pink background, blue on an yellow background and blue on a dark background are also appreciated mainly for the convenience of design. It is preferable that these background colors have brilliant luster.

Many method have been proposed to obtained color display images as described above. These methods utilize, for example, birefringent interference of ECB and STN, colored polarizers, diachronic dye and selective reflection of cholesteric liquid crystals. These conventional methods are described in the seventh chapter of "Handbook of Liquid Crystal Device (published by Nikkan Kogyo Shinbun Co.)" in detail.

These methods for displaying color images by the conventional liquid crystal devices have not been widely used by the reasons that the display images becomes dark, colors of the display images are limited, the reliability of display images are deteriorated or the production of the display devices is difficult. Besides, it was another problem that the reflective display images becomes dark when the transflective type display is performed by the conventional display device.

DISCLOSURE OF INVENTION

Accordingly, the object of the present invention is to provide a reflective and a transflective liquid crystal device for practical use that can display bright and brilliant colors.

The liquid crystal display according to the present invention comprises a liquid crystal panel comprising a pair of substrates between which a liquid crystal is inserted; a first polarizer provided at one side of the liquid crystal panel, not transmitting light having the first predetermined polarization components and transmitting light having predetermined polarization components being different than said first predetermined polarization components; and a reflective polarizer provided on the opposite side to the first polarizer relative to the liquid crystal panel, reflecting light having second predetermined polarization components at limited wavelength range within visible light, and transmitting light having predetermined polarization components being different than said second predetermined polarization components, and light having said second predetermined polarization components at wavelength range outside of said limited wavelength range within said visible light.

According to such construction, the colored images are displayed in case that light at limited wavelength range which is included in ambient light entering liquid crystal display is reflected by reflective polarizer, then transmit the first polarizer, and same color images as the background color of the reflective polarizer are displayed in case that ambient light entering liquid crystal display transmits the reflective polarizer. When a light absorption layer is provided at the back of the reflective polarizer, black images are displayed since the light transmitting the reflective polarizer is absorbed by the light absorption layer.

The wavelength range of the visible light is generally defined to be, as described in "wavelength limit of the visible radiation" in JIS Z 8113-1988, between 360 nm and 400 nm in the short wavelength side and between 760 nm and 830 nm in the long wavelength side. Accordingly, the limited wavelength range of the visible light means a part of the range from 360 nm to 400 nm or from 760 nm to 830 nm, approximately several tens nm to several hundreds nm. The limited wavelength range does not have to be a continuous wavelength range.

By selecting the wavelength region described above, it is possible to provide a bright and brilliant colors display with the liquid crystal device according to the present invention, since the light with the above wavelength region is recognized as specific colors by human's eyes. The liquid crystal device according to the present invention has a high reliability since the device is able to make use of conventional TN modes and STN modes, being also advantageous in that the production technology of these TN mode and STN mode liquid crystals have been already established.

The first predetermined polarization components and the second predetermined polarization components as mentioned herein may be either different or the same.

The liquid crystal device according to the present invention comprises a light source on the opposite side to the liquid crystal panel relative to the reflective polarizer.

In such construction, while the light source is turned on, in other words, while the transmissive display is performed, bright images are displayed when the light emitted from the light source transmits the first polarizer, and dark images are displayed when the light emitted from the light source is absorbed by the first polarizer. On the other hand, during the light source is turned off, in other words, the reflective display is performed, colored images are displayed in case that light at limited wavelength range which is included in ambient light entering liquid crystal display is reflected by reflective polarizer, then transmit the first polarizer, and same color images as the background color of the reflective polarizer are displayed in case that ambient light entering liquid crystal display transmits the reflective polarizer.

This means that a transflective liquid crystal device that is able to switch from the reflective display to the transmissive display or vice versa in accordance with turning on or off of the light source can be realized.

In providing the light source as hitherto described, it is required that the light source has dark surface when the light source is turned off. Such light source is obtainable by placing a translucent film or a black film perforated with fine holes over the light guide, or by placing a black film under the transparent light guide.

Though the light source as used herein denotes is, in a narrow sense, a luminous body such as a cold cathode ray tube or a LED, it corresponds to the entire back-light provided with a light guide, etc. in a wide sense. Any of the light sources described above are available in the present invention.

It is preferable that a second polarizer is provided between the reflective polarizer and the light source when a light source is provided on the opposite side to the liquid crystal panel relative to the reflective polarizer.

In the liquid crystal device including the foregoing reflective polarizer between the light source and liquid crystal panel, light at wave length region outside of the wavelength region which reflective polarizer reflects can transmit the reflective polarizer even polarization components of the light is equal to the reflective axis of the reflective polarizer.

Therefore, the dark images displayed in the transmissive display turns into colors at wave length region outside of the wavelength region which reflective polarizer reflects, in other words, becomes the complementary colors of the wavelength region which the reflective polarizer reflects. As the result, the contrast of the transmissive display deteriorates so lower that it is unsuitable for making use of depending on the use.

When a second polarizer is provided between the reflective polarizer and light source as described in the present invention, light having the same polarization components as the reflection axis of the reflective polarizer in which the light is included in the emitted light of the light source can be absorbed by the second polarizer. Accordingly, the dark color images displayed in the transmissive display can be prevented from being the complementary color in the reflection wavelength region of the reflective polarizer.

It is preferable that the absorption axis of the second polarizer is approximately aligned with the reflection axis of the reflective polarizer when the second polarizer is provided between the reflective polarizer and light source.

Aligning the absorption axis of the second polarizer with the reflection axis of the reflective polarizer enable to more efficiently absorb the light having the same polarization direction as the reflection axis of the reflective polarizer which emitted from the light source by the second polarizer. Further, aligning the absorption axis of the second polarizer with the reflection axis of the reflective polarizer necessarily make the polarization axis of the second polarizer align with the polarization axis of the reflective polarizer, consequently the transmittance with a maximum efficiency of the light along the polarization axis direction of the reflective polarizer which is emitted from the light source is realized, thereby the images in the transmissive display become bright.

The liquid crystal device according to the present invention comprises a film that absorbs the light having an wavelength outside of the wavelength range of the reflective polarizer between the reflective polarizer and the light source.

Providing with a film that absorbs the light having an wavelength outside of the wavelength range of the reflective polarizer between the reflective polarizer and the light source as described in the present invention allows the light with an wavelength outside of the reflection wavelength range of the reflective polarizer out of the light emitted from the light source to be absorbed, and consequently, the dark images displayed in the transmissive display can be prevented from being the complementary color in the reflection wavelength region of the reflective polarizer. As the result, the contrast in the transmissive display is improved. Besides, when the film described above is constructed so that a constant amount of light is absorbed in the entire wavelength region of the visible light, the dark display images in the reflective display becomes darker to improve the contrast.

It is preferable that the wavelength of the light emitted from the light source is within wavelength range capable of being reflected by said reflective polarizer.

When wavelength of light emitted from the light source is within wavelength range capable of being reflected by the reflective polarizer, the light emitted from the light source does not contain any light with an wavelength outside of the wavelength region which reflective polarizer reflects. This means that, since there is no light that reaches to the liquid crystal panel after transmitting the reflection axis of reflective polarizer, the light emitted from the light source and enters to the liquid crystal panel consists of only predetermined orientation. Accordingly, the dark display becomes darker to improve the contrast in the transmissive display because the polarization components of the light emitted from the light source and transmits the liquid crystal panel, can be aligned along one direction to allow the light to be absorbed by the first polarizer.

The forgoing reflective polarizer is characterized by containing a film comprising a layer with an anisotropic refraction index and a layer without any anisotropic refraction index alternately laminated with each other. It is advantage to laminate the plurality of films which reflection axis are aligned each other, and each film reflect light having different wavelength ranges.

By using the reflective polarizer comprising of the films laminated with each other, the liquid crystal devices having different display colors can be easily produced only by changing the combination of these films. Further, the above mentioned reflective polarizer also enable to produce a liquid crystal device having a plurality of display color regions with different display colors, so that the variations of the products using the liquid crystal device is expanded. An electronic device including a liquid crystal device as a display part, wherein said liquid crystal device comprising:

a liquid crystal panel comprising a pair of substrates between which a liquid crystal is inserted; a first polarizer provided at one side of said liquid crystal panel, not transmitting light having first predetermined polarization components and transmitting light having polarization components being different than said first predetermined polarization components; and a reflective polarizer provided on the opposite side to said first polarizer relative to said liquid crystal panel, reflecting light having second predetermined polarization components at a limited wavelength range within visible light, and transmitting light having polarization components being different than said second predetermined polarization components, and transmitting light having said second predetermined polarization components at wavelength range outside of said limited wavelength within said visible light.

According to the above mentioned structure, an electronic appliance capable of displaying bright and brilliant color images either under the direct sunlight or in the dark, being fashionable and consuming low electricity can be realized.

BEST MODE FOR CARRYING OUT THE INVENTION

The First Embodiment

Figure 1:
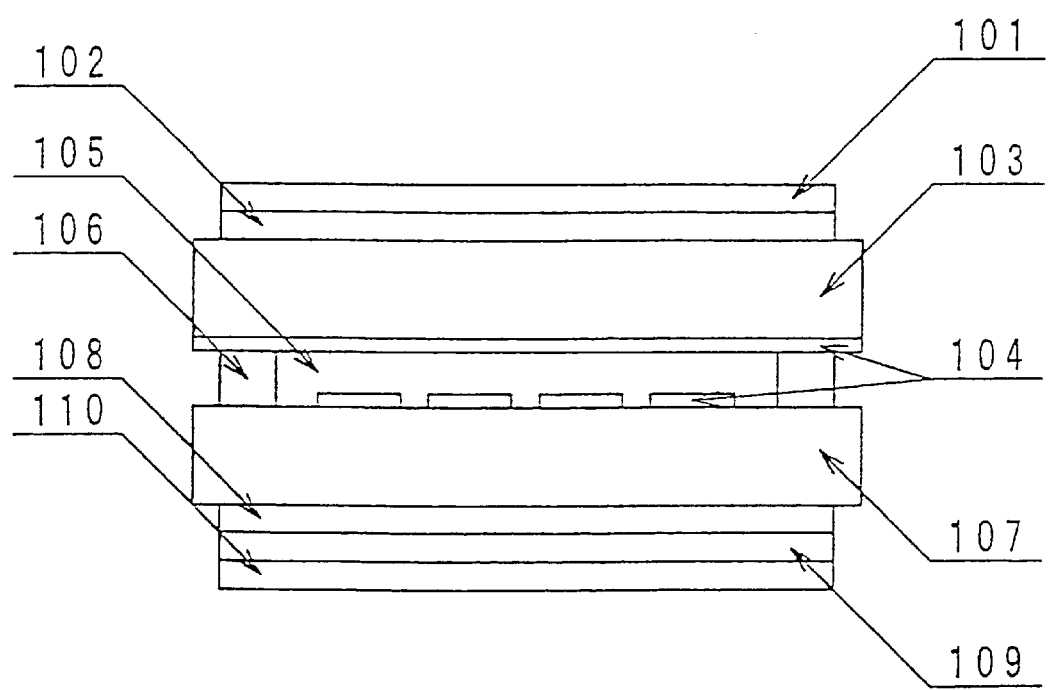
FIG. 1 is a drawing showing the major part of the structure of the liquid crystal device according to the first embodiment of the present invention.

FIG. 1 is a drawing showing the major part of the liquid crystal device according to the present invention. The construction will be described at first. In FIG. 1, 101 is a polarizer, 102 is a retardation film, 103 is a upper glass substrate, 104 is a transparent electrode, 105 is liquid crystal layer, 107 is a bottom side glass substrate, 108 is a light scattering plate, 109 is a reflective polarizer and 110 is a light absorption layer. The polarizer 101 and the retardation film 102, the retardation film 102 and the upper glass substrate 103, the bottom side glass substrate 107 and the light scattering plate 108, the light scattering plate 108 and the reflective polarizer 109, and the reflective polarizer 109 and the light absorption layer 110 are bonded with each other respectively with a paste. Although the space between the upper and bottom side transparent electrodes 104 is drawn widely apart for clear recognition of the drawing, they are actually confronted with each other with a narrow gap of several μm to several tens μm. Though the elements such as liquid crystal orientation films, insulation films, anti-glare films, spacer balls, driver IC's and driving circuits are essential other than the construction elements shown in the drawing, they are omitted since they are not especially needed to explain the present invention.

Now, each construction element will be described in orders. The polarizer 101 has a function to absorb a predetermined given linear polarized light component and transmit the remaining polarized light components. This is a most commonly used type of the polarizer produced by allowing halogens such as iodine or dichromic dyes to absorb on a polymer film.

The retardation film 102 is a uniaxial oriented film made of, for example, polycarbonate that is utilized for compensating coloring of the display of the STN type liquid crystal device. This film is often omitted in the TN type liquid crystal device.

The liquid crystal layers 105 are composed of a STN nematic liquid crystal composition twisted by an angle of 180° to 270°. A TN liquid crystal composition with a twist angle of 90° may be used when the display capacity is small. The twist angle is determined by the direction of the orientation treatment on the surface of the upper and bottom side glass substrates and the quantity of a chiral agent to be added in the liquid crystal.

A embossed plastic plate or a beads dispersed plastic plate maybe used for the light scattering plate 108. It is also possible to adhere the bottom side glass substrate 107 to the reflective polarizer 109 directly and mix beads into the adhesion layer to use the adhesion layer containing beads instead of the light scattering plate. The light scattering plate 108 is disposed for the purpose of adequately dispersing the reflected light from the reflective polarizer having a nearly specular reflection. However, it is possible to perform display without the light scattering plate 108. The position of the light scattering plate 108 may come in contact with 105, may be between 102 and 103 or may be on the top face of 101, besides the position between the bottom side glass substrate 107 and the reflective polarizer 109.

The light absorption layer 110 is prepared by adhering black vinyl sheets or black paper, or by giving a black paint directly on the layer. Relatively dark colors such as blue, brown or gray may be used other than black depending on the preference.

A birefringent dielectric multi-layer film was used for the reflective polarizer 109. This birefringent dielectric multi-layer film has a function to reflect light having predetermined linear polarized light component and to transmit the remaining polarized light component. Such reflective polarizers are disclosed in the published international patent applications (international application numbers WO 95/17303, WO 95/17691, WO 95/17692, WO 95/17699, WO 95/27919, WO 96/19347, WO 97/01439, WO 97/01440, WO 97/01610, WO 97/01726, WO 97/01774, WO 97/01778, WO 97/01780, WO 97/01781, WO 97/01788, WO 97/01789 and WO 97/07653). Such reflective polarizers are sold from 3M Co. as D-BEF (trade name) and are commonly available.

Figure 2:
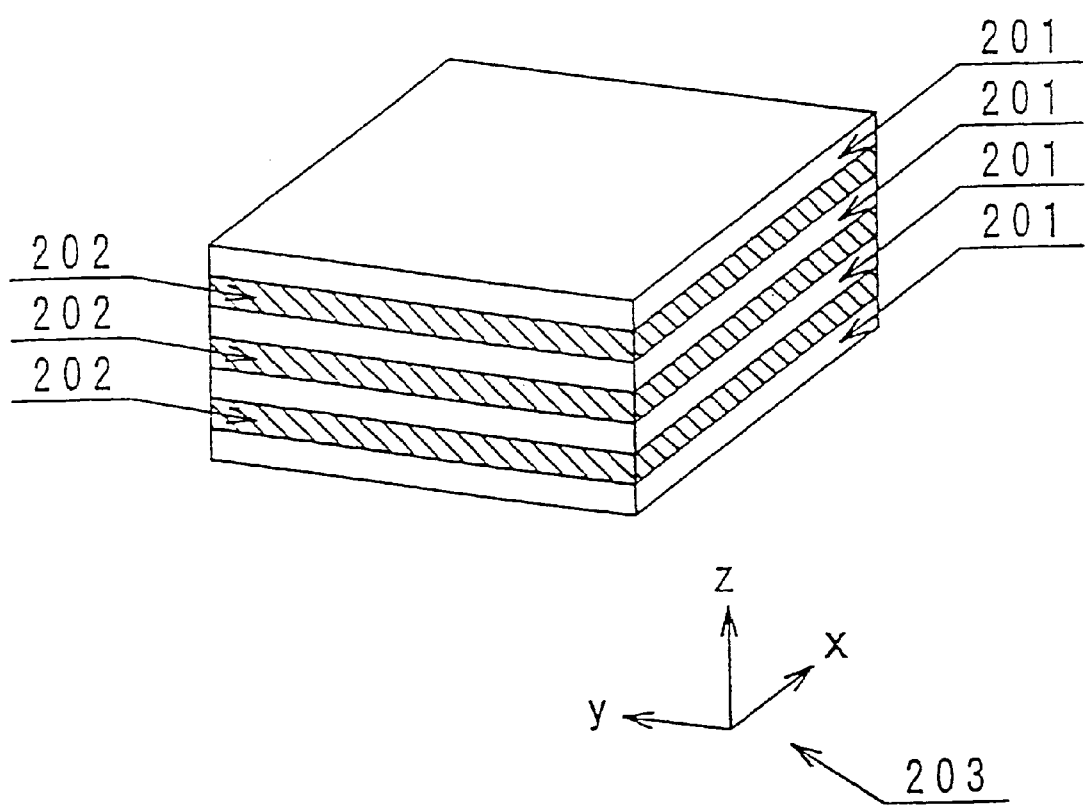
FIG. 2 is a drawing showing a part of the construction of the reflective polarizer used in the liquid crystal panel according to the present invention.

The construction and function of the reflective polarizer will be described referring to FIG. 2 and FIG. 3. FIG. 2 is a drawing showing the birefringent dielectric multi-layer film comprising two kinds of polymer layers 201 and 202 alternately laminated with each other. One of the two kinds of polymers is selected from a material having a large photoelastic coefficient and the other material is selected form a material having a low photoelastic coefficient, with paying attention so that the refractive index of ordinary rays of the both films becomes nearly equal. For example, PEN (2,6-polyethylene naphthalate) and coPEN (70-naphthalate/30-terephthalate copolyester) can be selected as a material with a large photoelastic coefficient and a material with a small photoelastic coefficient, respectively. When both kind of films are alternately laminated and appropriately oriented along the x-axis direction of the rectangular coordinate system 203 in FIG. 2, the refractive index along the x-axis direction were 1.88, in the PEN layer and 1.64, in the coPEN layer, respectively. The refractive index along the y-axis direction was about 1.64 either in the PEN layer or in the coPEN layer. When a light is entered into this laminated films from the normal line direction, the light component vibrating along the y-axis direction transmits the film as it is, which is termed as a polarization axis. On the other hand, the light component vibrating along the x-axis direction is reflected, only in the case when the PEN layer and coPEN layer satisfy a predetermined condition, which is termed as a reflection axis. The predetermined conditions mean that the sum total of the optical path length of the PEN layer (the product of the refractive index and film thickness) and the same of the coPEN layer (the product of the refractive index and film thickness) is equal to one half of the light wavelength. When such PEN layers and coPEN layers are laminated by several tens layers for each, or several hundreds layers for each if possible, almost all the light components vibrating along the x-axis direction can be reflected. It is needless to say that, since this condition is only valid for the light having a narrow wavelength range, a light-polarizing ability can be generated only in the light of limited colors.

Figure 3:
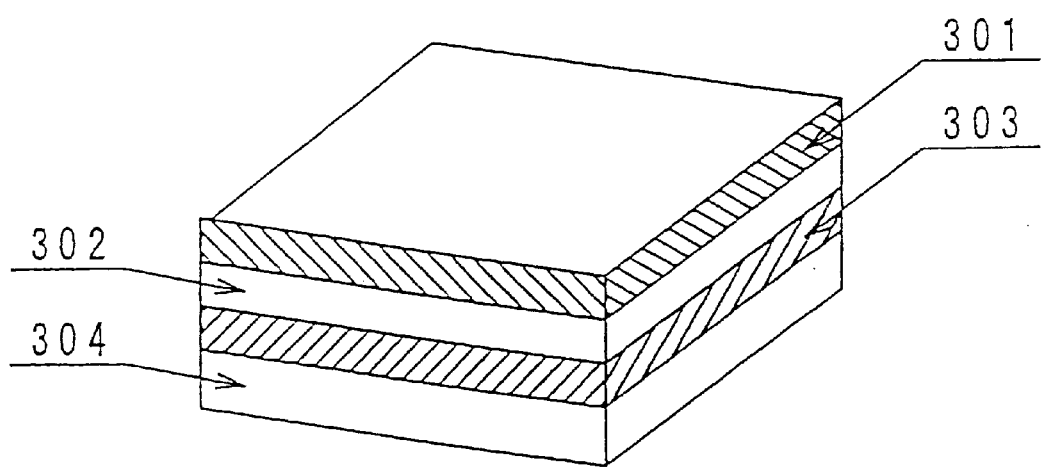
FIG. 3 is a drawing showing the construction of the reflective polarizer used for the liquid crystal device according to the present invention.

The reflective polarizer having a polarization ability in a broader wavelength region is constructed as shown in FIG. 3. In FIG. 3, 301 is a blue polarized light reflection film, 302 is a green polarized light reflection film, 303 is a red polarized light reflection film and 304 is a transparent base film. Films 301, 302 and 303, each of which comprising PEN layer and coPEN layer laminated each other, correspond to the birefringent dielectric multi-layer films in FIG. 2, respectively. The optical path length of each layer is adjusted so as to reflect the predetermined linearly polarized light of blue light, green light or red light, respectively. The film thickness of each layer is about 25 μm. The dielectric multi-layer films 301, 302 and 303 are laminated so that their polarization axes (reflection axes and transmittance axes) are in a parallel relation with each other.

Figure 4:
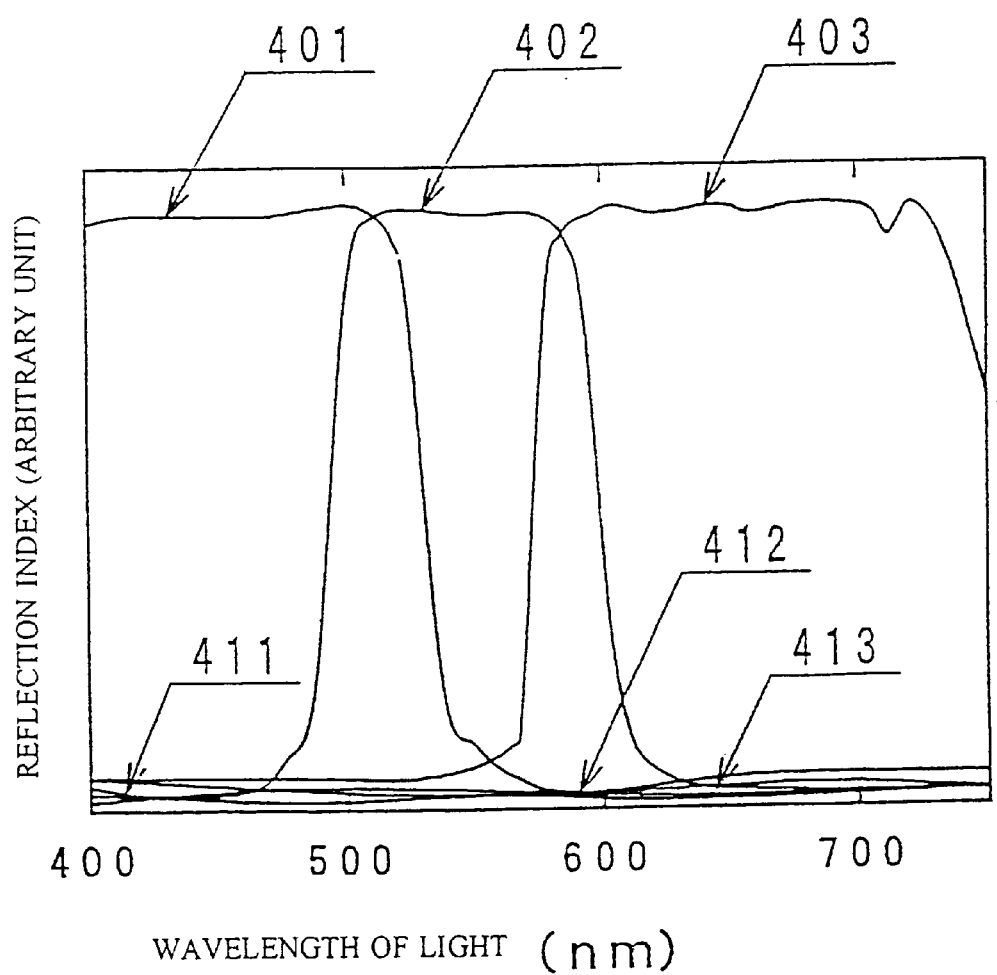
FIG. 4 is a graph showing the polarization characteristics of each layer of the reflective polarizer used for the liquid crystal device according to the present invention.

FIG. 4 is a graph showing the polarization characteristics of the foregoing blue polarized light reflection film 301, green polarized light reflection film 302 and red polarized light reflection film 303. The reference numerals 401, 402 and 403 correspond to the reflection spectra in the same direction of the reflection axis direction of 301, 302 and 303, respectively. While 411, 412 and 413 correspond to the reflection spectra in the same direction of the polarization axis direction of the dielectric multi-layer films 301, 302 and 303, respectively. The reflection wavelength regions of each 401, 402 and 403 are overlapped with each other. When such dielectric multi-layer films 301, 302 and 303 are laminated with their polarization axes aligned, a polarization ability throughout the entire wavelength region of the visible light can be generated. When one or two layers of them are laminated, the polarization ability is generated for a specific color only. According to the construction as described above, the reflective polarizer for each six colors of blue, green, red, yellow cyanogen and Magenta can be obtained.

Figure 5:
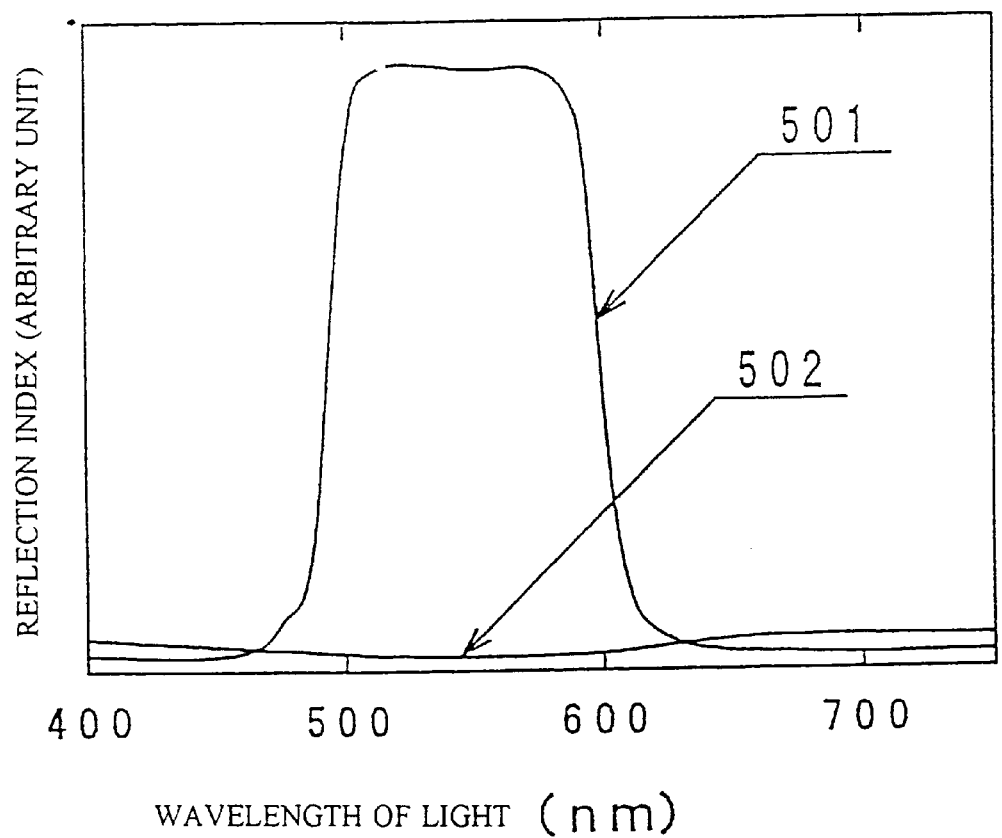
FIG. 5 is a graph showing the polarization characteristics of the green reflective polarizer used for the liquid crystal device according to the present invention.
Figure 6:
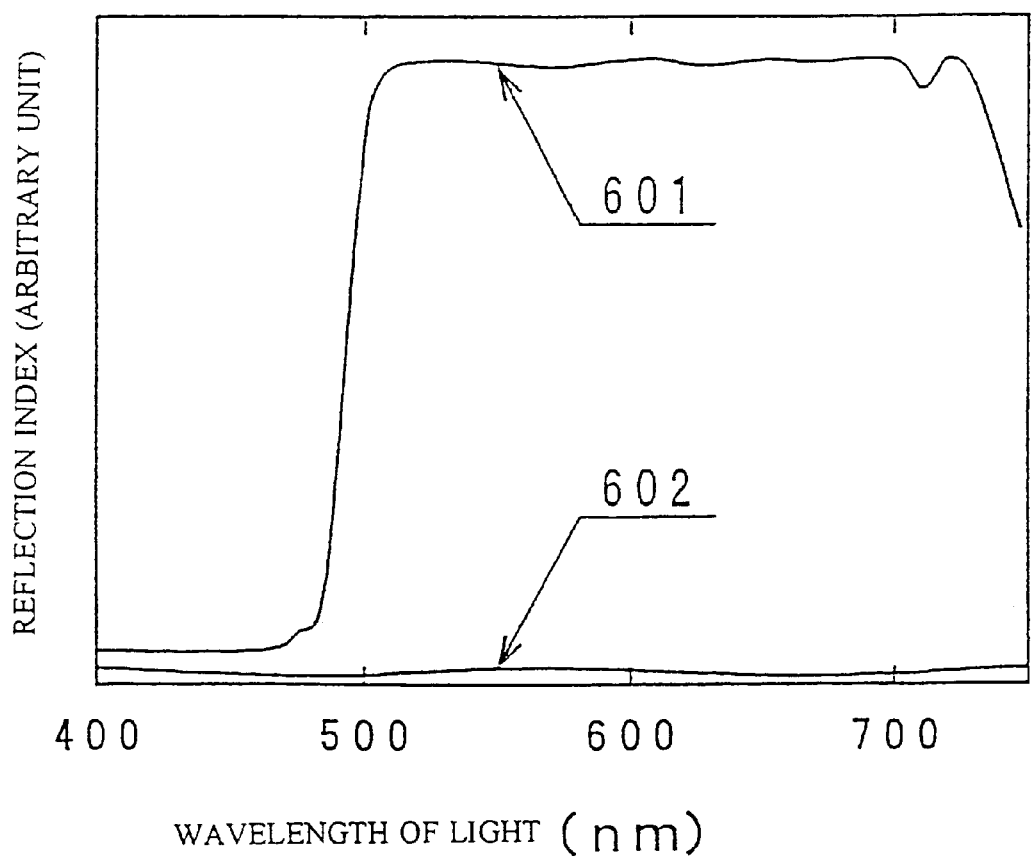
FIG. 6 is a graph showing the polarization characteristics of the yellow reflective polarizer used for the liquid crystal device according to the present invention.
Figure 7:
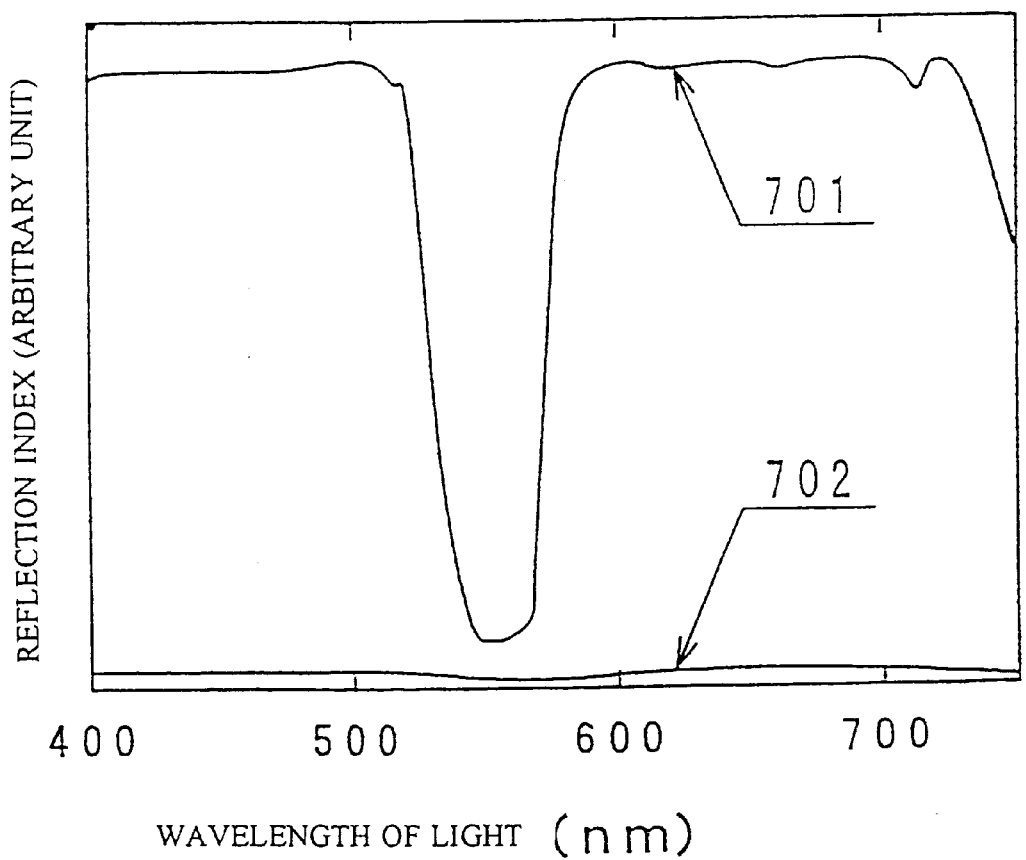
FIG. 7 is a graph showing the polarization characteristics of the Magenta color reflective polarizer used for the liquid crystal device according to the present invention.

FIG. 5, FIG. 6 and FIG. 7 are the graphs of the reflective polarizers constructed as described previously. The horizontal axis is the wavelength of light and the vertical axis is the refraction index, wherein the reflection spectras in same the direction of the reflection axis are indicated by 501, 601 and 701, respectively, and the reflection spectras in the same direction of the polarization axis are indicated by 502, 602 and 702, respectively. The reflective polarizer in FIG. 5 comprises only the green color polarized light reflection film having a function to reflect the linearly polarized light in the wavelength range of 500 to 590 nm (green light range) but not to reflect (namely, to transmit) the light outside of this range. Likewise, the reflective polarizer in FIG. 6 comprises lamination of the green polarized light reflection film and red polarized light reflection film having a function to reflect the linearly polarized yellow light but to transmit the light outside of this wavelength range. Further, the reflective polarizer in FIG. 7 comprises lamination of the blue polarized light reflection film and red polarized light reflection film having a function to selectively reflect the linearly polarized Magenta (pink) color light but to transmit the light outside of this wavelength range.

A liquid crystal polymer with a cholesteric phase can be also utilized as a reflective polarizer besides the birefringent dielectric multi-layer film as described above. This liquid crystal polymer has a function to reflect a predetermined circular polarized light component but to transmitting the other polarized light components. This liquid crystal polymer has a function to reflect a predetermined linearly polarized light component but to transmit the other polarized light components when combined with a ¼ wavelength plate. Details of such reflective polarizer are disclosed in Japanese Patent Laid-open No. 8-271837. Such reflective polarizers are commonly available by the name of TransMax (trade name) sold by Merck Co.

The function of the reflective liquid crystal device according to the first embodiment will be described hereinafter. A green polarized light reflection film shown in FIG. 5 is used in the following descriptions. In FIG. 1, the retardation and the twist angle of the liquid crystal layers 105, the retardation and the direction of the optical axis of retardation film 102, and the direction of the polarized light axis both of the absorption type polarizer 101 and reflective polarizer 109 are adjusted so that the luminous display is performed when the liquid crystal device is in a non-selective state while the dark display is performed when the liquid crystal device is in a selective state. Such selection allows a green display is performed in the non-selective state in accordance with the reflection characteristics of the reflective polarizer, while a black display is performed in the selective state since all the light is absorbed by the light absorption layer 110 after transmitting the reflective polarizer. Thereby a black display on a green background is realized. This green display is very bright and clear besides having high visibility because the reflective polarizer has a high refraction index and the wavelength selectivity is superior. Further, since reflection itself from the reflective polarizer 109 is a specular reflection, a glitter and lustrous display can be performed by adjusting the scattering characteristics of the light scattering plate 108. Besides, on the contrary, when the liquid crystal device is adjusted so as to perform dark display in the non-selective state and to perform luminous display in the selective state, a green display on a black background is realized.

Any colors other than the colors hitherto described can be displayed by changing the reflection wavelength range of the reflective polarizer and the colors of the light absorption layer in various manners. For example, when the yellow polarized light reflection film shown in FIG. 6 is utilized, black display on an yellow background or a an yellow display on a dark background is realized. Further, when the absorption layer is blue, a blue display on an yellow background or an yellow display on a blue background can be realized. Besides, when Magenta (pink) polarized light reflection film shown in FIG. 7 is utilized, a black display on a Magenta color background or a Magenta color display on a dark background is realized.

The Second Embodiment

Figure 8:
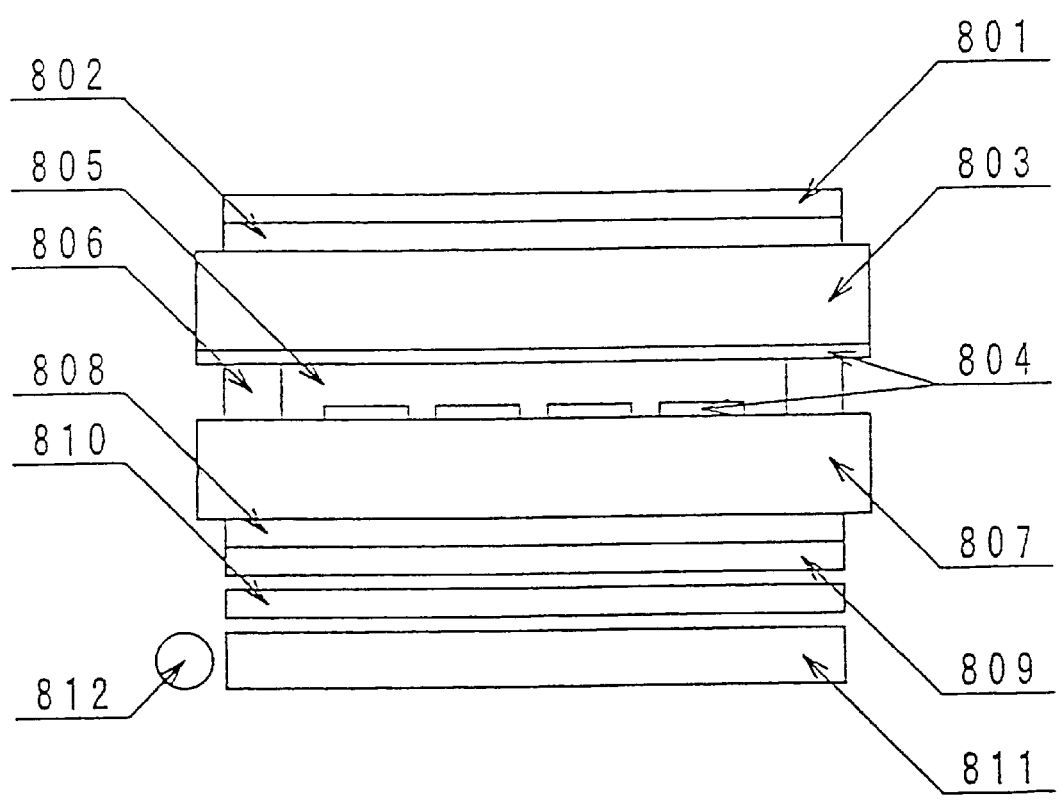
FIG. 8 is a drawing showing the major part of the structure of the liquid crystal device according to the second embodiment and fifth embodiment of the present invention.

FIG. 8 is a drawing showing the major part of the structure of the liquid crystal display according to the present invention. Firstly, the construction is described. In FIG. 8, 801 is a polarizer, 802 is a retardation film, 803 is a upper glass substrate, 804 is a transparent electrode, 805 is liquid crystal layer, 806 is a seal, 807 is a bottom side glass substrate, 808 is a light scattering plate, 809 is a reflective polarizer, 810 is a half light-absorption layer, 811 is a light guide plate and 812 is a light source lamp, wherein the lamp 812 and the light guide plate 811 comprise a back-light 813 as a light source. The polarizer 801 and the retardation film 802, the retardation film 802 and the glass substrate 803, the bottom side glass substrate 807 and the light scattering plate 808, and the light scattering plate 808 and the reflective polarizer 809 are adhered with a paste with each other, respectively.

Each construction element will be described below. The same construction elements as those used in the first embodiment were also utilized in this embodiment as the polarizer 801, the retardation film 802, the liquid crystal layer 805, the light scattering plate 808 and the reflective polarizer 809.

A gray translucent film can be utilized for the half light-absorption layer 110. For the gray translucent film, a light scattering film having a transmittance of 10% or more through 80% or less, more preferably 50% or more through 70% or less, against the entire wavelength range of the visible light is suitable. Such film is, for example, commonly available in the name of light scattering film of D202 (trade name) sold by Tsujimoto Denki Co. This film has a gray colored appearance and has a transmittance of 59%. Besides, a light absorption film being partially transparent, for example a black film with perforated holes, which is as small as invisible with naked eyes, is also available.

For the light guide plate 811, either of a transparent acrylic plate with white pigments printed on or a transparent acrylic plate having a lot of fine holes (or projections) may be used. A light scattering plate, a light condensing plate or a reflection plate may be provided with in adjacent to the light guide plate, if necessary.

For the light source lamp 812, LED (a light emitting diode) or a cold cathode ray tube may be used. In the second embodiment, a cold cathode ray tube emitting a white light was utilized.

The main point requires by a light source utilized in the present invention is that the reflects of the external light is small. The structure shown in FIG. 8 comprising the half light-absorption layer 810, the light guide plate 811 and the light source lamp 812 shown in FIG. 8 is one example thereof. In addition, it is also available to use the structure wherein a light-absorption layer is provided at the back side of the light guide plate but a half-light absorption layer is not provided with. Further, utilizing an EL lamp, which is designed to emit the light in the transparent state or dark scattering state, enables to make the structure more simple.

Figure 9:
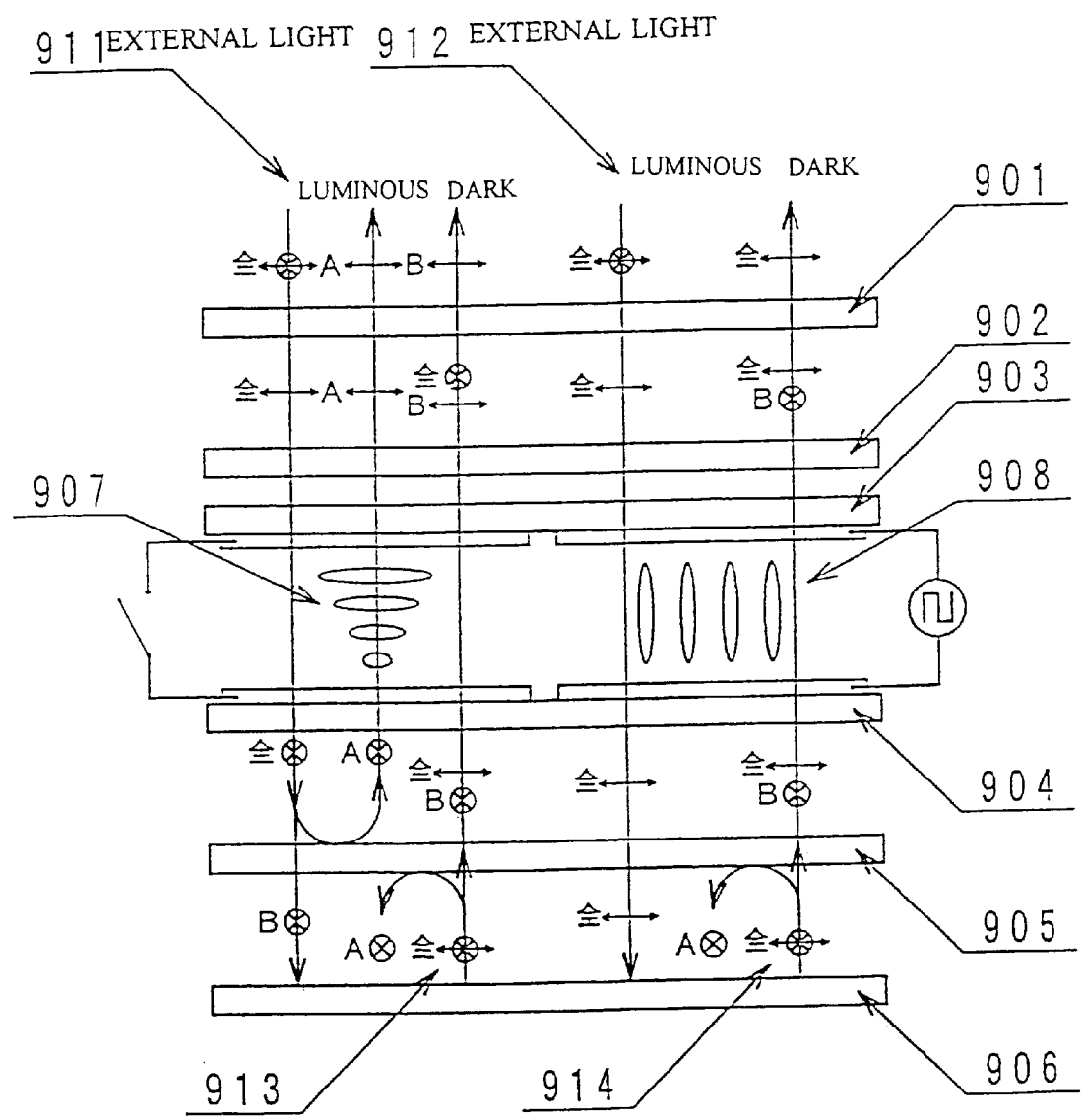
FIG. 9 is a drawing showing the principle of display of the liquid crystal device according to the second embodiment of the present invention.

The principle of display of the liquid crystal device according to the second embodiment will be described hereinafter. In FIG. 9, 901 is a polarizer, 902 is a retardation film, 903 is a upper glass substrate, 904 is a bottom side glass substrate, 905 is a reflective polarizer, 906 is a light source, 907 is a liquid crystal in the non-selective region and 908 is a liquid crystal in the selective region. The green polarized light reflection film having the characteristics shown by 905 in FIG. 5 was used in the subsequent descriptions. In the figures, "A" denotes the green light, "B" denotes Magenta light that is a complementary color of "A" and "Total" (ZEN) denotes a sum total of "A" and "B", namely white light.

Firstly, the case when the light source 906 is not luminous, namely the case of the reflective display is described below. The external lights of 911 and 912 entered from the upper side are converted into a linearly polarized light by the polarizer 901. After then, though the light experiences various modulation through the retardation film and liquid crystal panel, the light is approximately reverted to the linearly polarized light when the light enters into the reflective polarizer 905. However, the light after passing through the non-selective region and the light after passing through the selective region of the liquid crystal are orthogonal with each other. Therefore, the reflective polarizer is previously arranged so as to reflect the light after passing through the non-selective region and to transmit the light after passing through the selective region. In the non-selective region, the green color component out of the linearly polarized light entering into the polarizer is reflected while the Magenta color component, which is a complementary color of said green color component is transmitted. The reflected green color component is projected out upward through the same light path as described above, on the other hand, the transmitted Magenta color component is absorbed by the light source or by the light absorber placed at the front or rear of light source. Accordingly, the non-selective region corresponds to the bright green display. While, the selective region corresponds to the dark display since all the linearly polarized light entering into the reflective polarizer is transmitted and then absorbed by the light source or by the absorber placed at the front of rear of light source.

The case when the light source 906 is luminous, in other words the case of the transmissive display, will be discussed hereinafter. In the circumstances where the transmissive display is used in the transflective liquid crystal device, the environment is supposed to be sufficiently dark. Therefore, the external lights 911 and 912 are neglected herein. The green color component out of the one linearly polarized light of the lights 913 and 914 emitted from the light source 906 is reflected by the reflective polarizer 905 while the remaining Magenta color component and the other linearly polarized light are transmitted. This light component is modulated by the liquid crystal panel and the retardation film, and only the Magenta light component transmits in the non-selective region owing to the polarizer 901, thereby a relative dark Magenta color display is obtained. On the other hands, a bright white display can be obtained in the selective region by allowing the white light to transmit.

As hitherto described, a black display on the green background in the reflective display and a white display on the Magenta color background in the transmissive display can be respectively obtained in the liquid crystal device according to the second embodiment. A black display on the yellow background in the reflective display and a white display on the blue background in the transmissive display can be obtained provided that the yellow polarized light reflection film as shown in FIG. 6 is utilized for the reflective polarizer. Besides, a black display on the Magenta color background in the reflective display and a white display on the green background in the transmissive display can be obtained provided that the Magenta polarized light reflection film as shown in FIG. 7 is utilized.

The Third Embodiment

There may be a case where the transflective display according to the second embodiment is not suitable for using depending on its application field because the dark display in the transflective display is colored in a color outside of the reflection wavelength region of the reflective polarizer, in other words, becomes the complementary color in the reflection wavelength region of the reflective polarizer. This coloring problem is solved in the liquid crystal device according to the third embodiment by providing a polarizer between the light source and the reflective polarizer.

Figure 10:
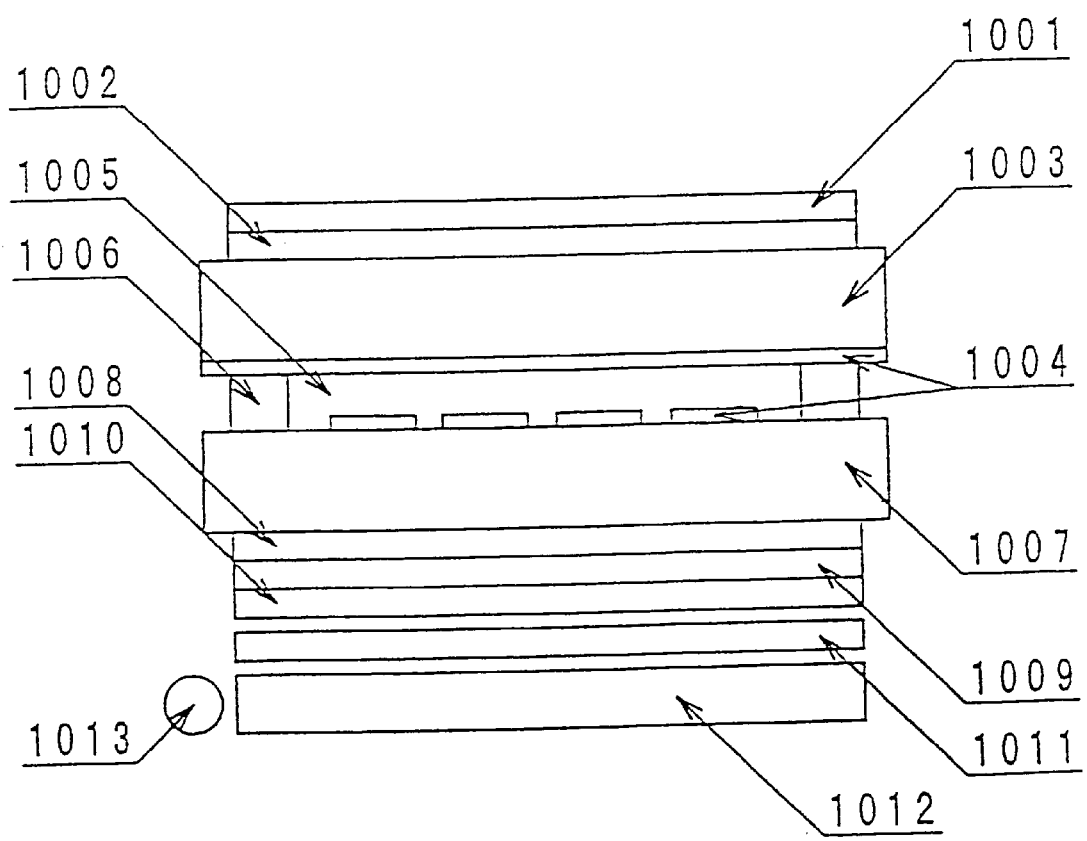
FIG. 10 is a drawing showing the major part of the structure of the liquid crystal device according to the third embodiment of the present invention.

FIG. 10 is a drawing showing the major part of the structure of the liquid crystal device according to the present invention. The construction will be described at first. In FIG. 10, 1001 is a polarizer, 1002 is a retardation film, 1003 is a upper glass substrate, 1004 is a transparent electrode, 1005 is liquid crystal layer, 1006 is a seal, 1007 is a bottom side glass substrate, 1008 is a light scattering plate, 1009 is a reflective polarizer, 1010 is a polarizer, 1011 is a half light-absorption layer, 1012 is a light guide plate and 1013 is a light source. The polarizer 1001 and the retardation film 1002, the retardation film 1002 and the upper glass substrate 1003, the bottom side glass substrate 1007 and the light scattering plate 1008, the light scattering plate 1008 and the reflective polarizer 1009, and the reflective polarizer 1009 and the polarizer 1010 are adhered with each other with a paste, respectably.

Each constitution element will be described in orders. The same elements as those used in the second embodiment were also used in this embodiment as the polarizer 1001, the retardation film 1002, the liquid crystal layer 1005, the light scattering plate 1008, the reflective polarizer 1009, the half light-absorption layer 1011, the light guide plate 1012 and the light source 1013. Though the same polarizer as the polarizer 1001 can be also used for the polarizer 1010, it is all the polarizer 1010 requires that the polarizer has polarization ability at least in all the visible light range outside of the reflection wavelength region of the reflective polarizer. In other words, in case of applying the green polarized light reflection film shown in FIG. 5, a polarizer having a polarization ability at least for the Magenta color is utilized.

Figure 11:
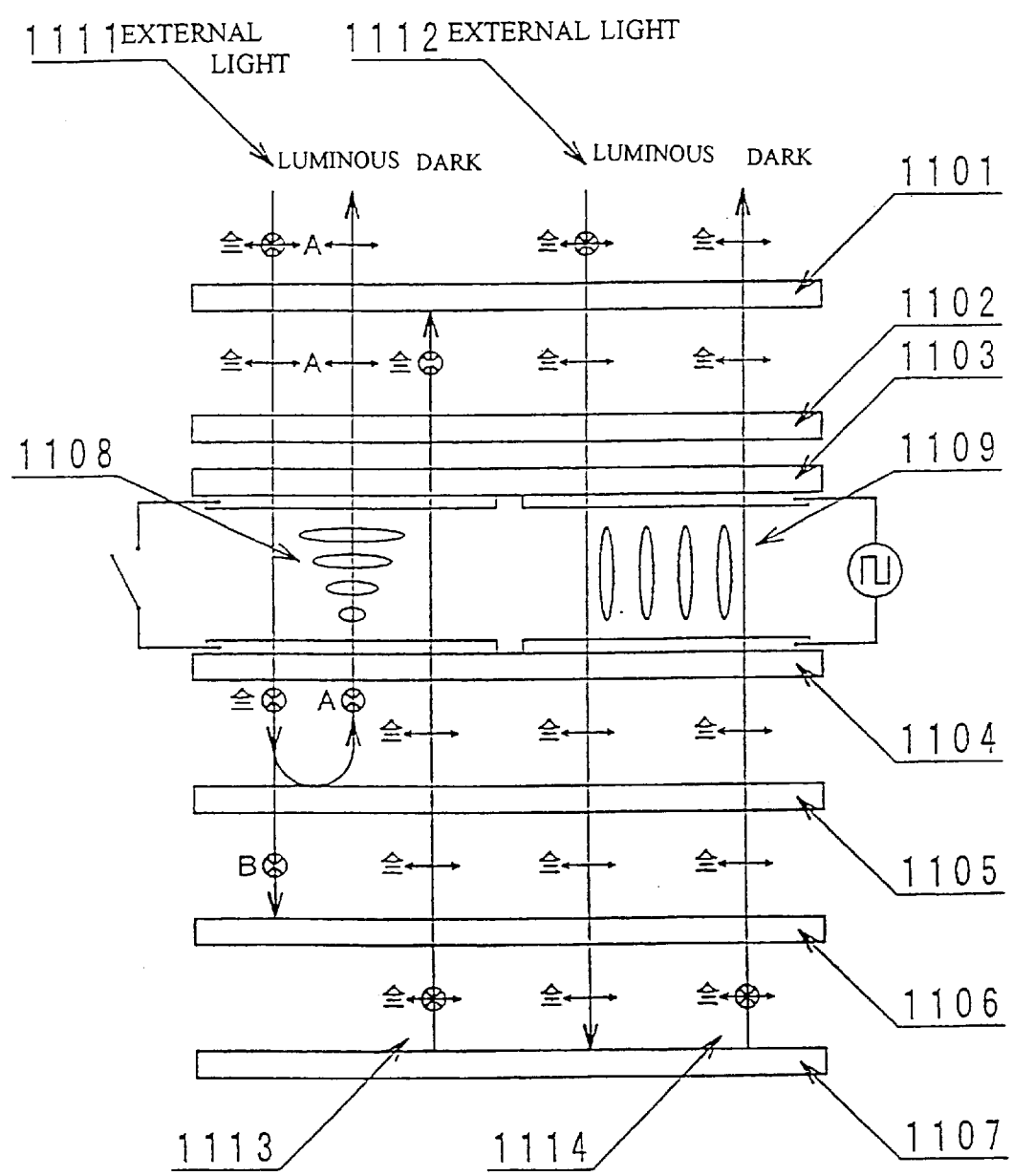
FIG. 11 is a drawing showing the principle of display of the liquid crystal device according to the third embodiment of the present invention.

The principle of display of the liquid crystal device according to the third embodiment of the present invention will be described hereinafter. In FIG. 11, 1101 is a polarizer, 1102 is a retardation film, 1103 is a upper glass substrate, 1104 is a bottom side glass substrate, 1105 is a reflective polarizer, 1106 is a polarizer, 1107 is a light source, 1108 is a liquid crystal device in the non-selective region and 1109 is a liquid crystal device in the selective region. The green polarized light reflection film having the characteristics shown in FIG. 5 was used as 1105 and a white light source was used as 1107, in the following descriptions. In the drawing, "A" denotes the green color light, "B" denotes Magenta color light that is a complementary color of "A" and "Total" (ZEN) denotes a sum total of "A" and "B", namely a white color light.

Considering the case when the light source 1107 is not luminous, in other words, the case of the reflective display. The external lights 1111 and 1112 entering from upward are converted into a linearly polarized light by the polarizer 1101. After then, though the light experiences various modulation through the retardation film and liquid crystal panel, it is reverted to the approximate linearly polarized light when the light enters into the reflective polarizer 1105. However, the light after passing through the non-selective region and the light after passing through the selective region of the liquid crystal panel are orthogonal with each other. Therefore, the reflective polarizer is previously arranged so as to reflect the light after passing through the non-selective region and to transmit the light after passing through the selective region. The green color component out of the linearly polarized light entering into the polarizer is reflected while the Magenda color component, which is a complementary color of said green color component is transmitted. The reflected green color component is projected out upward through the same light path as described above, on the other hand, the transmitted Magenta color component is absorbed by the polarizer 1106. Accordingly, the non-selective region corresponds to the bright green display. On the contrary, the selective region corresponds to the dark display since all the linearly polarized light entering into the reflective polarizer is transmitted and then absorbed by the light source 1107 or by the absorption layer placed at the front of rear of the light source.

The case when the light source 1107 is luminous, in other words, the case of the transmissive display, will be discussed hereinafter. In the circumstances where the transmissive display is used in the transflective liquid crystal device, the environment is supposed to be sufficiently dark. Therefore, the external lights 1111 and 1112 are neglected herein. The lights 1113 and 1114 emitted from the light source 1107 are converted into linearly polarized lights by the polarizer 1106 and are directly transmit the reflective polarizer 1105. This light is modulated by the liquid crystal panel and retardation film and exhibit a dark display in the non-selective region and a luminous display in the selective region through the polarizer 1101. Coloring is not observed in any regions. A high contrast is obtained because the degree of polarization of a polarizer is higher than that of the reflective polarizer, in generally.

As described above, a black display on the green background in the reflective display and a white display on the dark background were obtained in the liquid crystal device according to the third embodiment. A black display on the yellow background in the reflective display and a white display on the black background in the transmissive display can be obtained provided that the yellow polarized light reflection film shown in FIG. 6 is utilized for the reflective polarizer. Besides, a black display on the Magenta color background in the reflective display and a white display on the black background in the transmissive display can be obtained provided that the Magenta polarized light reflection film shown in FIG. 7 is utilized. Although the display becomes white on the black background in any case of the transmissive display owing to a white light source, a red display on the dark background can be obtained if a red light source is utilized.

The Fourth Embodiment

The transflective liquid crystal device according to the fourth embodiment also intends to solve coloring problem in the dark display in the transmissive display of the transflective liquid crystal device as seen in the liquid crystal device according to the fourth embodiment.

Figure 12:
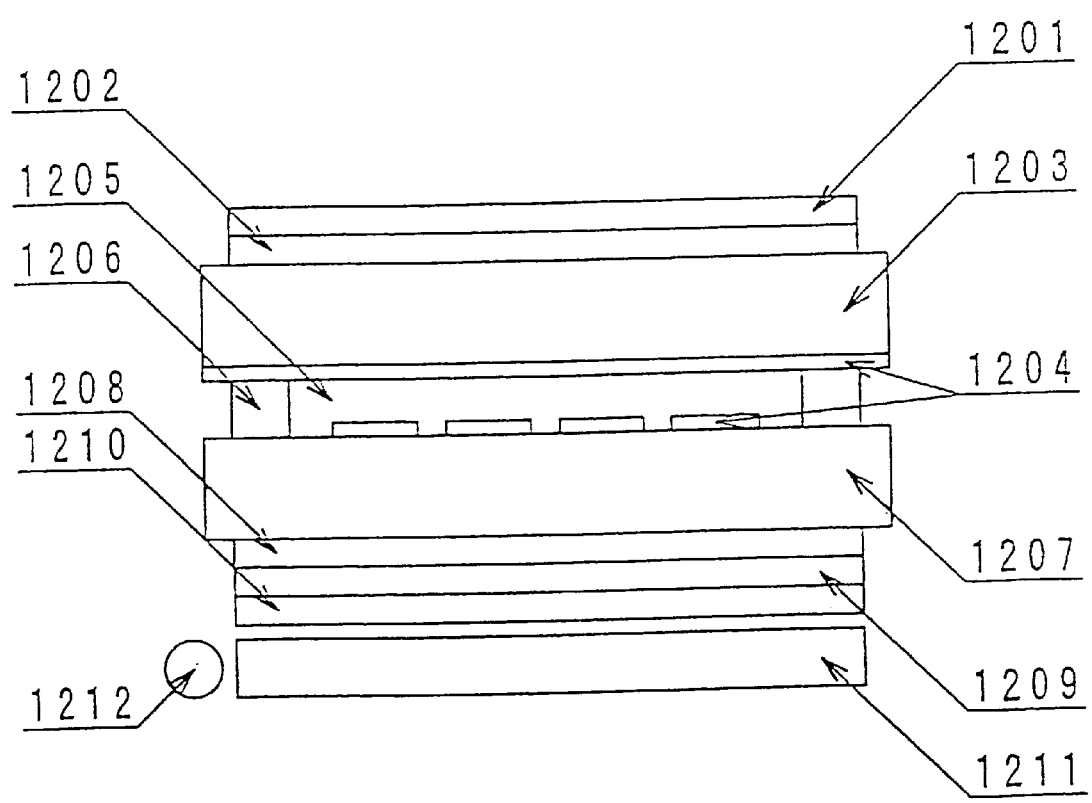
FIG. 12 is a drawing showing the major part of the structure of the liquid crystal device according to the fourth embodiment of the present invention.

FIG. 12 is the drawing showing the major part of the structure of the liquid crystal device according to the present invention. The construction will be described at first. In FIG. 12, 1201 is a polarizer, 1202 is a retardation film, 1203 is a upper glass substrate, 1204 is a transparent electrode, 1205 is liquid crystal layer, 1206 is a seal, 1207 is a bottom side glass substrate, 1208 is a light scattering plate, 1209 is a reflective polarizer, 1210 is a color film, 1211 is a light guide plate and 1212 is a light source. The polarizer 1201 and the retardation film 1202, the retardation film 1202 and the upper glass substrate 1203, the bottom side glass substrate 1207 and the light scattering plate 1208, the light scattering plate 1208 and the reflective polarizer 1209, and the reflective polarizer 1209 the color film 1210 are respectively adhered with each other with a paste.

Each construction element will be then described in orders. The same construction elements as those used in the second embodiment were also utilized in this embodiment as the polarizer 1201, the retardation film 1202, the liquid crystal layer 1205, the light scattering plate 1208, the reflective polarizer 1209, the light guide plate 1211 and the light source 1212.

Figure 14:
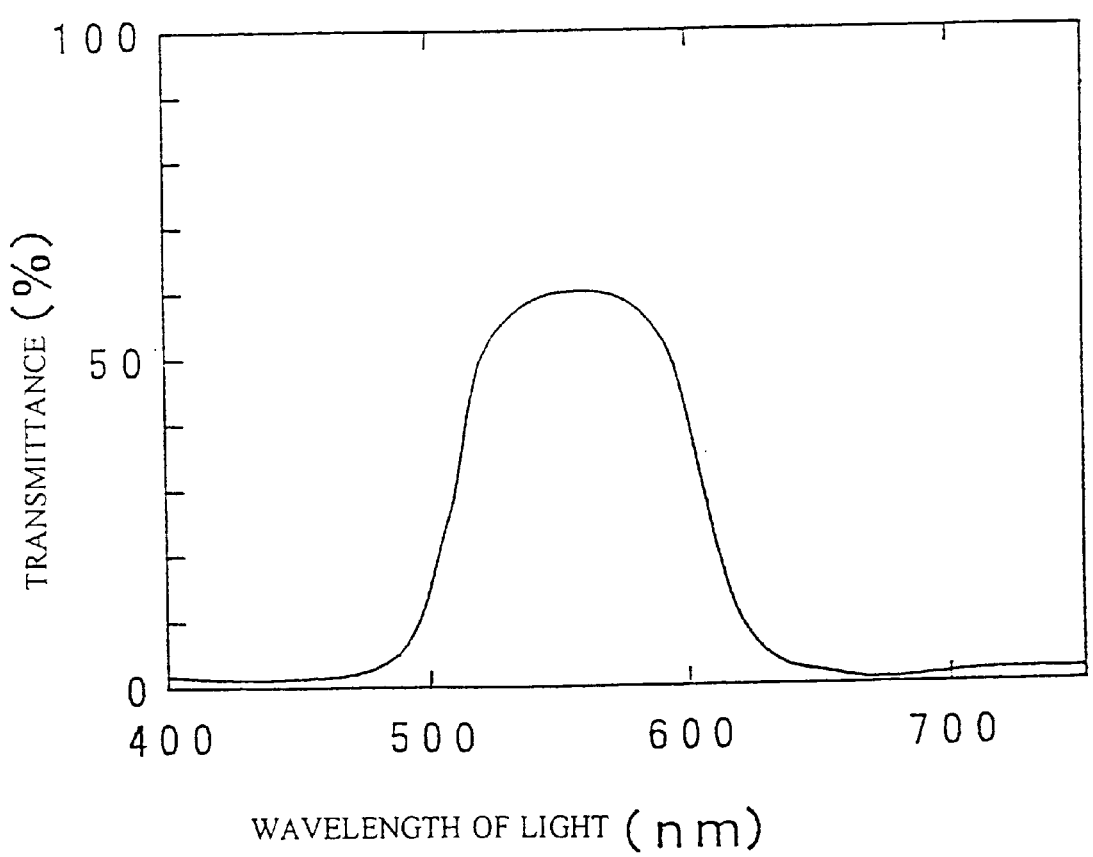
FIG. 14 is a graph showing the transmittance characteristics of the color film used for the liquid crystal device according to the fourth embodiment of the present invention.

The color film 1210 mainly has characteristics to absorb predetermined light in the entire wavelength region of the visible light along with absorbing the light outside of the reflection wavelength region of the reflective polarizer 1209. For example, when the green polarized light reflection film shown in FIG. 5 was utilized for a reflective polarizer, a deep green color film having a transmittance characteristics to absorb mainly the light in the Magenta color wavelength region as shown in FIG. 14 can be used. Since this film also has a absorption band in the green wavelength region, it can be used instead of the half light-absorption film 810 in FIG. 8 in the second embodiment or the half light-absorption film 1011 in FIG. 10 in the third embodiment, exhibiting an effect to enhance the contrast in the reflective display.

Figure 13:
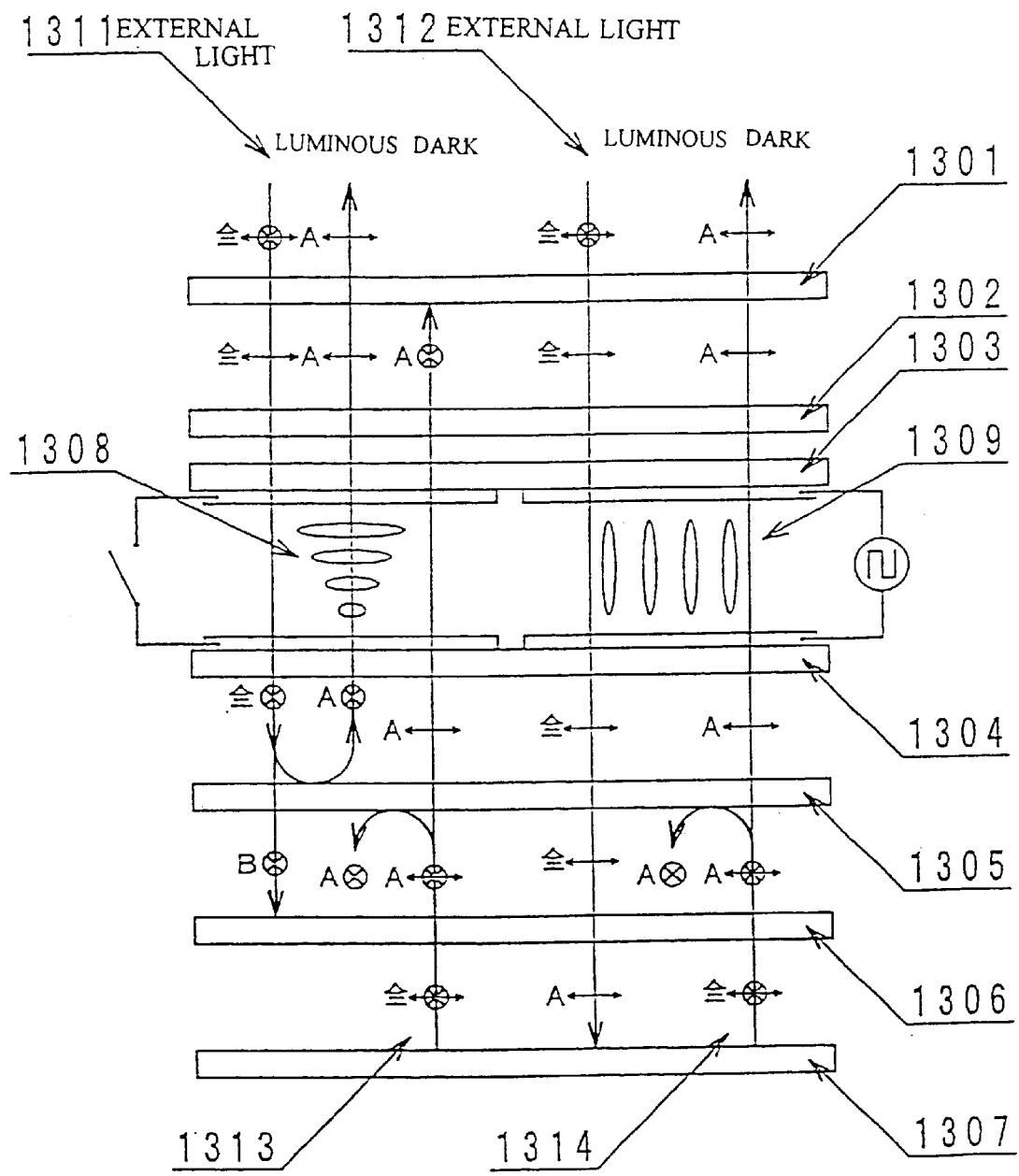
FIG. 13 is a drawing showing the principle of display of the liquid crystal device according to the fourth embodiment of the present invention.

The principle of display of the liquid crystal device according to the fourth embodiment of the present invention will be described hereinafter. In FIG. 13, 1301 is a polarizer, 1302 is a retardation film, 1303 is a upper glass substrate, 1304 is a bottom side glass substrate, 1305 is a reflective polarizer, 1306 is a color film, 1307 is a light source, 1308 is a liquid crystal in the non-selective region, and 1309 is a liquid crystal in the selective region. The green polarized light reflection film having the characteristics as shown in FIG. 5 is utilized as 1305, the deep green color film having the characteristics as shown in FIG. 14 is utilized as 1306 and a white light source were utilized as 1307, respectively, in the following description. In the drawing, "A" denotes the green color light, "B" denotes Magenta color light that is a complementary color of "A" and "Total" ("ZEN")denotes a sum total of "A" and "B", namely a white color light.

Nextly, the case when the light source 1307 is not luminous, in other words, the case of the reflective display is described hereinafter. The external lights 1311 and 1312 entered from the upper side are converted into a linearly polarized light by the polarizer 1301. After then, though the light experiences various modulation through the retardation film and liquid crystal panel, the light is reverted to the approximate linearly polarized light when the light is enters the reflective polarizer 1305. However, the light after passing through the non-selective region and the light after passing through the selective region of the liquid crystal panel are orthogonal with each other. Therefore, the reflective polarizer 1305 is previously arranged so as to reflect the light after passing through the non-selective region and to transmit the light after passing through the selective region. In the non-selective region, the green color component out of the linearly polarized light entering into the reflective polarizer 1305 is reflected while the Magenta color component, which is a complementary color of said green color component is transmitted. The reflected green color component is projected out upward through the same light path as described above, on the other hand, the transmitted Magenta color component is absorbed by the color film 1306. Accordingly, the non-selective region corresponds to the bright green color display. On the contrary, the selective region corresponds to the dark display since all the linearly polarized light entering into the reflective polarizer 1305 is transmitted and then absorbed by the color film 1306 or in front or rear of the light source.

The case when the light source 1307 is luminous, in other words, the case of the transmissive display, will be discussed hereinafter. In the circumstances where the transmissive display is used in the transflective liquid crystal device, the environment is supposed to be sufficiently dark. Therefore, the external lights 1311 and 1312 are neglected herein. Only the green color component out of the lights 1313 and 1314 projected from the light source 1307 transmits the color film 1306, which is then converted into linearly polarized lights by the reflective polarizer 1305. This light is modulated by the liquid crystal panel and retardation film and shows a dark display in the non-selective region and a luminous display in the selective region by means of the polarizer 1301.

As described above, a black display on the green background in the reflective display and a green display on the dark background were realized in the liquid crystal device according to the fourth embodiment. A black display on the yellow background in the reflective display and an yellow display on the black background in the transmissive display can be obtained provided that the yellow polarized light reflection film as shown in FIG. 6 is utilized for a reflective polarizer and a deep yellow color film are utilized for the color film, respectively. Besides, a black display on the Magenta color background in the reflective display and a Magenta color display on the black background in the transmissive display can be obtained provided that the Magenta polarized light reflection film as shown in FIG. 7 is utilized for the reflective polarizer and a deep Magenta color film are utilized as the color film, respectively.

The Fifth Embodiment

The transflective liquid crystal device according to the fifth embodiment also intends to solve the coloring problem in the dark display in the transmissive display of the transflective liquid crystal device as seen in the liquid crystal device according to the third embodiment.

FIG. 8 is the drawing showing the major part of the structure of the liquid crystal device according to the present invention. Its construction is basically the same as the second embodiment according to.

Figure 15:
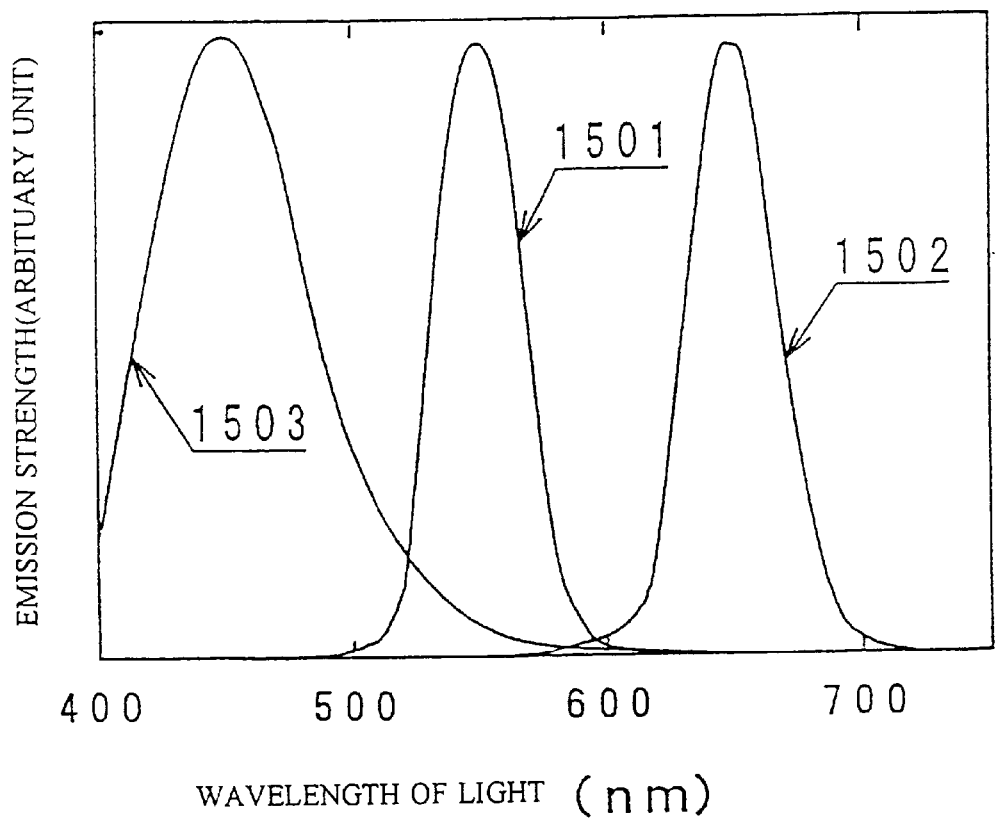
FIG. 15 is a graph showing the spectral characteristics of the light generated by the LED lamp used for the liquid crystal device according to the fifth embodiment of the present invention.

However, a light source emitting mainly the light within the wavelength range of the reflective polarizer 809 was utilized as the light source 812. For example, when the green polarized light reflection film having the polarization characteristics shown in FIG. 5 is utilized, a ZnSe LED emitting a green color light 1501 shown in FIG. 15 is suitable. When the yellow polarized light reflection film polarizer having the polarization characteristics shown in FIG. 6 is utilized, the ZnSe LED emitting the green light 1501 or a GaAlAs LED emitting a red light 1502 shown in FIG. 15 is suitable. When a Magenta polarized light reflection film having the polarization characteristics shown in FIG. 7 is utilized, the CaAlAs LED emitting a red light 1502 or a SiC LED emitting a blue light 1503 shown in FIG. 15 is suitable.

The principle of the liquid crystal device according to the fifth embodiment of the present invention can be elucidated as the liquid crystal device according to the fourth embodiment provided that the color film 1306 and the light source 1307 are replaced with one colored light source. It is also possible to provide a polarizer between the light source and the reflective polarizer as the third embodiment, exhibiting an effect to improve the contrast because the absorption type polarizer has a higher degree of polarization than the reflective polarizer.

Accordingly, a black display on the green background in the reflective display and a green display on the dark background in the transmissive display can be obtained provided that the green polarized light reflection film polarizer having the polarization characteristics shown in FIG. 5 and the LED emitting a green light 1501 shown in FIG. 15 are utilized. Likewise, a black display on the yellow background in the reflective display and a green display on the black background in the transmissive display can be obtained provided that the yellow polarized light reflection film having the polarization characteristics shown in FIG. 6 and the LED emitting a green light 1501 shown in FIG. 15 are utilized. Besides, a black display on the yellow background in the reflective display and a red display on the black background in the transmissive display can be obtained provided that the yellow polarized light reflection film having the polarization characteristics shown in FIG. 6 and the LED emitting a red light 1502 shown in FIG. 15 are utilized. Further, a black display on the Magenta color background in the reflective display and a red display on the black background in the transmissive display can be obtained provided that the Magenta polarized light reflection film having a polarization characteristic shown in FIG. 7 and the LED emitting the red light 1502 shown in FIG. 15 are utilized. Furthermore, a black display on the Magenta color background in the reflective display and a blue display on the black background in the transmissive display can be obtained provided that the Magenta color polarized light reflection film having a polarization characteristic shown in FIG. 7 and the LED emitting a blue light 1503 shown in FIG. 15 are utilized.

The Sixth Embodiment

Figure 16:
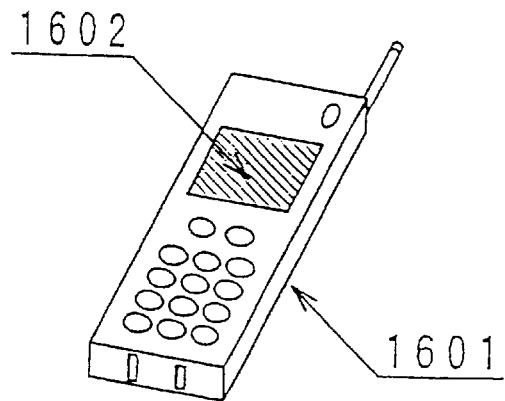
FIG. 16 is a drawing showing the appearances of the electronic appliances according to the sixth embodiment of the present invention, wherein A is a portable telephone, B is an watch and C is a portable information processing instrument.
Figure 16:
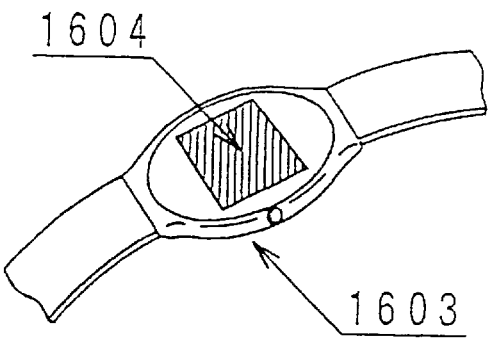
Figure 16:
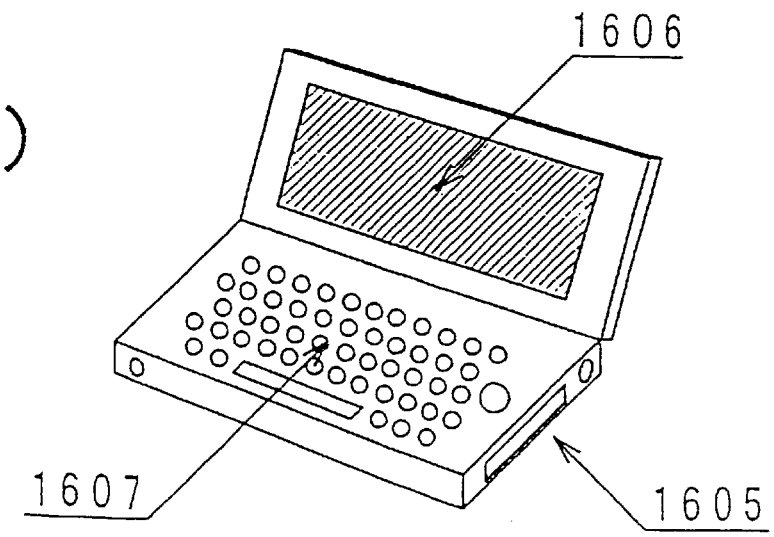

Examples of electronic appliances according to the present invention will be illustrated in FIG. 16A to C.

All the liquid crystal devices described in the first embodiment to the fifth embodiment are able to display bright and brilliant colors. Especially, the display of green color or yellow color give a psychologically brighter feeling than the white color. However, both types of display are performed by reflective display or a transmissive display. Therefore, the liquid crystal device according to the present invention can be used in various environments as well as being most suitable for the portable instruments that require a low consumption of electricity.

FIG. 16(a) shows a portable telephone in which a display part 1602 is provided at the front-top of the main unit 1601. A liquid crystal device described in any one of the first embodiment to the fifth embodiment is attached to the display part 1602. The portable telephone is used in a variety of environments regardless in the room or outdoors. The portable telephone is often utilized in an automobile where it is very dark at night. Accordingly, the transflective liquid crystal device is desirable for the display device utilized in the portable telephone, wherein a reflective display that consumes low electricity is mainly used but a transmissive display making use of an auxiliary light is also available, if required. The liquid crystal device according to the present invention is brighter and more brilliant than the conventional liquid crystal devices either in the reflective display or in the transmissive display.

FIG. 16(b) shows an watch that includes a display part 1604 at the center of the main unit 1603. Any one of the liquid crystal devices according to the first embodiment to the fifth embodiment is attached to the display part 1602. The most important concept in use of watches is a fashion sense. The liquid crystal device according to the present invention has the advantages to select the display colors freely in harmony with the color of the frame or belt of the watch, as a result, a variety of images can be produced. It is easy for the liquid crystal device according to the present invention to partially change the display color in a panel by partially changing the construction of layers of the reflective polarizer in the reflective liquid crystal device. Accordingly, an easily recognizable display can be realized, for example, by dividing the display face of the watch into three areas, and then changing the colors of each area such that one area corresponds to a black display on the white background, one area corresponds to a black display on the yellow background and one area corresponds to a black display on the red background, and displaying each images at each part.

FIG. 16(C) shows a portable information processing instrument in which a display part 1606 and an input part 1607 are provided at the top and bottom portions of the main unit 1605, respectively. Any one of the liquid crystal devices according to the first embodiment to the fifth embodiment is attached to the display part 1606. Touch keys are often provided on the front face of the display part. Although the conventional display of the touch key is hardly recognizable since a surface reflection is predominant, the present invention provides a display recognition by sight of which is never impaired even in such case because of the bright and brilliant display.

As described above, the liquid crystal device according to the present invention comprises a liquid crystal panel comprising a pair of substrates between which a liquid crystal is inserted; a first polarizer provided at one side of the liquid crystal panel, absorbing the light of polarized light component having the first predetermined direction but transmitting the light of the polarized light component having a different direction from the polarized light component having said first predetermined direction; and a reflective polarizer provided on the opposite side to the first polarizer relative to the liquid crystal panel, reflecting the light of the polarized light component having said second predetermined direction and a limited wavelength range of the visible light and transmitting the light of the polarized light component having different direction from the polarized light component having said second predetermined direction and the light of the polarized light component having said second predetermined direction but also having an wavelength range outside of the limited wavelength range of said visible light. Accordingly, it is possible to display the visible light within a predetermined wavelength region with the same color as the background color of the reflective polarizer.

A liquid crystal device, which is able to perform transmissive display as well as to perform the above described reflective display of the color within said predetermined wave length range can be obtained according to the present invention, since a light source is also provided on the opposite side to the liquid crystal panel relative to the reflective polarizer.

A liquid crystal device with further improved contrast in the transmissive display can be obtained by simultaneously applying the following means: disposing a polarizer between the reflective polarizer and the light source, disposing a film that absorbs the light with an wavelength outside of the reflection wavelength region of the reflective polarizer between the reflective polarizer and the light source, or adjusting the wavelength of the light emitted from the light source within the reflection wavelength range of the reflective polarizer, etc.

Further, according to the present invention, an electronic appliance, which is fashionable, law consumption of electricity and capable of displaying bright and brilliant colors even either in the dark or under the direct ray of the sun can be realized, since the electronic appliances according to the present invention is including a liquid crystal device with a display part comprising a liquid crystal panel comprising a pair of substrates between which a liquid crystal is inserted; a first polarizer provided at one side of the liquid crystal panel, absorbing the light of polarized light component having the first predetermined direction and transmitting the light of the polarized light component having different direction from the polarized light component having said first predetermined direction; and a reflective polarizer provided on the opposite side to said first polarizer relative to the liquid crystal panel, reflecting the light of the polarized light component having the second predetermined direction and a limited wavelength range of the visible light and transmitting the light of the polarized light component having different direction from the polarized light component having said second predetermined direction and the light of the polarized light component having said second predetermined direction and an wavelength range outside of the limited wavelength range of the visible light.

What is claimed is:

1. A liquid crystal device comprising:
a liquid crystal panel comprising a pair of substrates between which a liquid crystal is inserted;
a first polarizer provided at one side of said liquid crystal panel, not transmitting light having first predetermined polarization components and transmitting light having polarization components being different than said first predetermined polarization components; and
a reflective polarizer provided on the opposite side to said first polarizer relative to said liquid crystal panel, wherein said reflective polarizer includes a plurality of layers having various optical path lengths adjusted to reflect linearly polarized light of different limited wavelength ranges within visible light, said wavelength ranges are recognized as specific colors by human eyes,
said reflective polarizer reflecting light having second predetermined polarization components at said limited wavelength ranges within visible light, and transmitting light having polarization components being different than said predetermined polarization components, and transmitting light having second predetermined polarization components to wavelength range outside of said limited wavelength ranges within said visible light.

2. The liquid crystal device according to claim 1, wherein a light absorption layer is provided on the opposite side of said liquid crystal panel relative to said reflective polarizer.

3. The liquid crystal device according to claim 1, wherein a light source is further provided on the opposite side of said liquid crystal panel relative to said reflective polarizer.

4. The liquid crystal device according to claim 3, wherein a second polarizer is provided between said reflective polarizer and said light source.

5. The liquid crystal device according to claim 4, wherein an absorption axis of said second polarizer is approximately aligned with a reflection axis of said reflective polarizer.

6. The liquid crystal device according to claim 2, wherein a film capable of absorbing the light at wavelength different from the wavelength range reflected by said reflective polarizer is provided between said reflective polarizer and said light source.

7. The liquid crystal device according to claim 2, wherein the light emitted from the light source is within a wavelength range capable of being reflected by said reflective polarizer.

8. The liquid crystal device according to claim 1, wherein each of said plurality of films comprising a layer with an anisotropic refraction index and a layer without any anisotropic refraction index alternately laminated with each other.

9. The liquid crystal device according to claim 8, wherein said plurality of said films having their reflection axes aligned with each other.

10. An electronic device including a liquid crystal device as a display part, wherein said liquid crystal device comprises:
a liquid crystal panel comprising a pair of substrates between which a liquid crystal is inserted;
a first polarizer provided at one side of said liquid crystal panel, not transmitting light having first predetermined polarization components and transmitting light having polarization components being different than said first predetermined polarization components; and
a plurality of films laminated on one another with their reflection axes approximately aligned with each other defining a reflective polarizer for generating polarization ability of wavelength ranges of desired colors, each of said films reflecting light having different wavelength ranges wherein each of said wavelength ranges are recognized as specific colors to human eyes,
said reflective polarizer provided on the opposite side of said first polarizer relative of said liquid crystal panel for reflecting light having second predetermined polarization components at said limited wavelength range within visible light, and transmitting light having polarization components being different than said second predetermined polarization components, and transmitting light having said second predetermined polarization components at a wavelength range outside of said limited wavelength within said visible light,
wherein said liquid crystal device adapted for use in said electronic device allows reflective and transflective displays of light and brilliant colors.

11. A liquid crystal device comprising:
a first substrate;
a second substrate opposite said first substrate;
a liquid crystal disposed between said first and second substrates;
a first polarizer adjacent said first substrate, said first polarizer transmitting light having polarization components which are different from first predetermined polarization components and not transmitting light having said first predetermined polarization components; and
a plurality of films laminated on one another with their reflection axes approximately aligned with each other defining a second polarizer when laminated together wherein each of said films include a first layer with an anisotropic refraction index laminated on a second layer without an anisotropic refraction index for reflecting light having different wavelength ranges of specific colors as recognized by human eyes,
said second polarizer reflecting light having second predetermined polarization components of said given wavelength ranges within visible light and transmitting light having polarization components which are different from said second predetermined polarization components including light having said second predetermined polarization components in a wavelength range outside of said given wavelength ranges within visible light.

12. The liquid crystal device of claim 11 further comprising a light absorption layer disposed proximate said first substrate and opposite said second polarizer.

13. The liquid crystal device of claim 11 further comprising a light source disposed proximate said first substrate and opposite said second polarizer.

14. The liquid crystal device of claim 13 further comprising a third polarizer disposed between said second polarizer and said light source.

15. The liquid crystal device of claim 14 wherein an absorption axis of said third polarizer is approximately aligned with a reflection axis of said second polarizer.

16. The liquid crystal device of claim 12 further comprising a light absorbing film disposed between said second polarizer and said light source for absorbing light having wavelengths which are different from said given wavelength range.

17. The liquid crystal device of claim 12 wherein said light source emits light including said given wavelength range.

* * * * *